United States Patent [19]

Boersma

[11] 4,258,410
[45] Mar. 24, 1981

[54] HIGH VOLTAGE DISTRIBUTION SYSTEM WITH MOVABLE VOLTAGE MEASURING TRANSFORMER

[75] Inventor: Rintje Boersma, Harmelen, Netherlands

[73] Assignee: Coq B.V., Utrecht, Netherlands

[21] Appl. No.: 63,817

[22] Filed: Aug. 6, 1979

[30] Foreign Application Priority Data

Sep. 4, 1978 [NL] Netherlands .......................... 7809048

[51] Int. Cl.³ .............................................. H02B 1/18
[52] U.S. Cl. ..................................... 361/332; 361/334; 336/105
[58] Field of Search .................. 200/50 AA; 363/144, 363/146; 361/331, 332, 334–336, 338, 340, 427–429; 336/105, 107

[56] References Cited

U.S. PATENT DOCUMENTS

| | | | |
|---|---|---|---|
| 3,052,820 | 9/1962 | Kreekon | 361/340 |
| 3,157,827 | 11/1964 | Tjebben | 361/340 |
| 3,717,805 | 2/1973 | Gnaedinger | 361/338 |

Primary Examiner—Gerald P. Tolin
Attorney, Agent, or Firm—John P. Snyder

[57] ABSTRACT

Metal clad switchgear, comprising in one of the compartments of, or in a separate casing associated with its envelope system a movable voltage measuring transformer which is adapted to be adjusted in various positions, in one of which at least one of the high tension terminals of said transformer is connected to a conductor of the switchgear, in another one of which said terminal may be connected to earth and in still another one of which said terminal may be dead.

6 Claims, 3 Drawing Figures

HIGH VOLTAGE DISTRIBUTION SYSTEM WITH MOVABLE VOLTAGE MEASURING TRANSFORMER

The invention relates to metal clad switchgear comprising at least one conductor contained within the earthed metal envelope system of the switchgear and a voltage measuring transformer which is accommodated in an individual compartment of said envelope system or in an earthed metal casing of its own connected to the envelope system of the switchgear.

Metal clad switchgear of this kind is, in many cases, dielectrically tested by means of high alternating voltages having nominal frequences and by means of high direct voltages.

On the other hand voltage measuring transformers are mostly tested by means of high voltages, of which the frequency is higher than the nominal frequency. This frequency is chosen, as to ensure that the effects affecting the voltage measuring transformator due to the inductive saturation of the magnetic circuit are avoided. The high voltage is usually produced by connecting the low voltage winding of the voltage measuring transformer to a voltage source. The power available for the testing in this way is limited and usually it is insufficient to test at the same time, the switchgear connected to the voltage measuring transformer.

During dielectrical tests of metal clad switchgear or parts thereof or of the voltage measuring transformer thereof usually the voltage measuring transformer and the switchgear will be disconnected from one another. In many cases this disconnection will be achieved by the disassembly of the voltage measuring transformer. After the testing the voltage measuring transformer must be mounted again. The work to discharge and to supply again the insulating gas has then to be repeated. This complicated disassembly and reassembly require much labour and, consequently, are expensive. Moreover, owing to the reassembly of the voltage measuring transformer such changes may occur in the switchgear or in the measuring transformer that the test results are not valid for the switchgear or for the voltage measuring transformer.

The disassembly and the assembly described hereabove could be dispensed with, should an isolator switch be inserted between the switchgear and the measuring transformer. However, isolators for this purpose are expensive, so that mostly the use thereof is economically not justified.

According to the invention the above meant possibility of separation is achieved, in that the voltage measuring transformer is mounted for movement in its compartment or its own envelope, so as to be adjustable into various positions, in one of which said transformer is connected with its high tension terminal to said conductor of the switchgear. In this manner the voltage measuring transformer itself forms the switching element. The means to move the measuring transformer may be simple, since the volume and the weight of the measuring transformer are relatively small and no insulation for high voltages need to be used in said means, as the magnetic circuit has already been insulated for the full tension in respect of the high voltage winding. The voltage measuring transformer may be mounted for rotation in its compartment or its own casing. It is also possible to so construct the transformer as to enable it to move in a straight line.

In the normal condition of operation the transformer will be always connected with its high tension terminal to a conductor of the metal clad switchgear.

In an other position the said terminal of the measuring transformer may be separated from this conductor and connected to an earthed contact. In this position of the measuring transformer it is possible to test the switchgear or parts thereof dielectrically without exposing the voltage measuring transformer to the test voltage applied to the switchgear.

Furthermore, the arrangement may be so carried out, as to enable the voltage measuring transforer to be moved into a dead position, in which the high tension terminal of the transformer is neither connected to earth nor with the said conductor. In said dead position the tensionable parts of the high tension transformer winding are so connected in respect of earth and the said conductor, as to make it possible to test the voltage measuring transformer without putting other parts of the switchgear under tension.

The invention will be further elucidated with the aid of the drawings.

Figure 1:
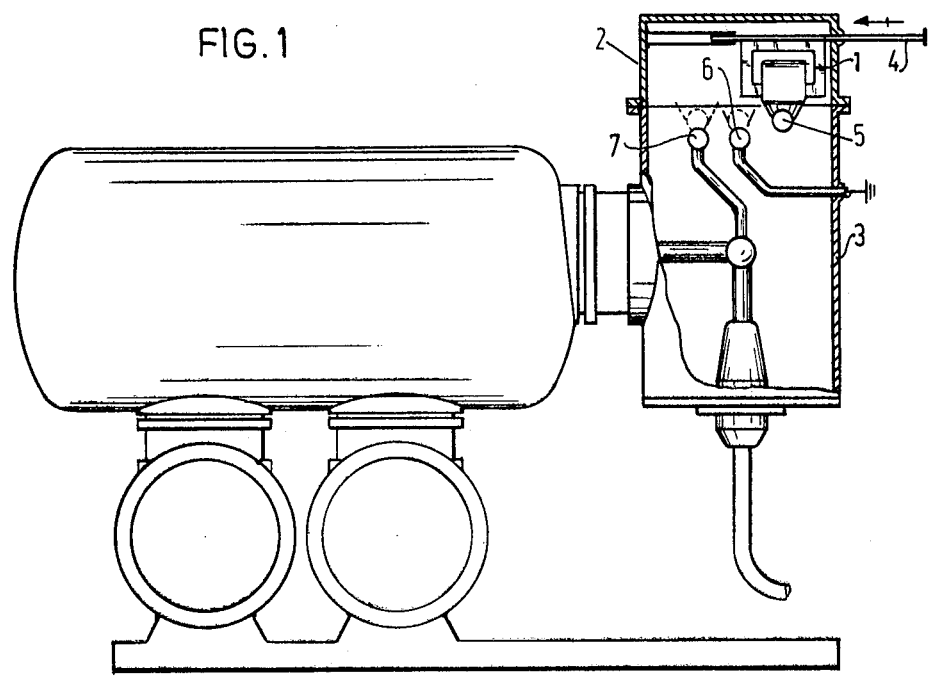
FIG. 1 shows diagrammatically switchgear including a voltage measuring transformer according to the invention.

The voltage measuring transformer 1 is contained in the dielectric space defined by the envelope system of the switchgear, this space being defined in part by the metal casing 2 which is mounted on top of the casing portion 3 of the switchgear.

The voltage measuring transformer is attached to a slidable member 4. This slidable member may be hollow and lead at the same time the low voltage connecting wires through the envelope. The measuring transformer is shown in its dead position, in which the terminal 5 of its high tension winding is in a position which is isolated both from earth and from a conductor of the switchgear. By sliding the member 4 the terminal 5 of the high tension winding may be connected to an earthed contact 6 or to a contact 7 which is connected with one of the conductors of the switchgear.

Figure 2:
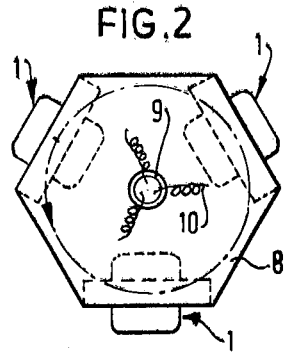
FIG. 2 illustrates diagrammatically a plan view of a part of metal clad three phase switchgear comprising movable measuring transformers which are mounted for rotation.

FIG. 2 shows diagrammatically a possible arrangement of three voltage measuring transformers for metal clad three phase switchgear. In this embodiment the three transformers 1 are suspended by a metal plate 8, to which a hollow shaft 9 mounted for rotation in the casing of the voltage measuring transformers is attached. The connecting conductors 10 for the high tension windings extend through the hollow shaft 9 to the outside. The transformer assembly may be suspended by any suitable means such as a thrust collar attached to the shaft 9 above the cover 12.

Figure 3:
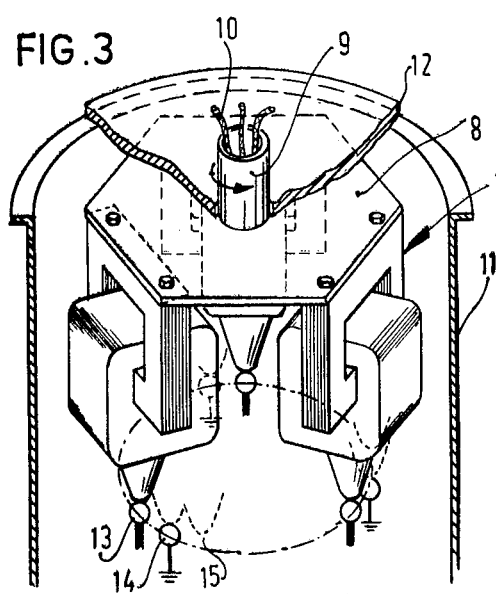
FIG. 3 shows a view in perspective of a part of metal clad three phase switchgear with measuring transformers which are mounted for movement by rotation.

FIG. 3 illustrates the same three phase arrangement of the voltage measuring transformers 1, which are accommodated in their own casing 11, on which a cover 12 is mounted. The metal plate 8 provided with the hollow shaft 9 is suspended for rotation by the cover 12. The hollow shaft 9 is used for leading the low tension connecting conductors 10 out.

By rotation of the metal plate the measuring transformers can be successively brought into position, in which they are connected with conductors 13 of the switchgear, into positions, in which they are connected with earthed contacts 14, and into dead position 15.

What I claim is:

1. In a high voltage electrical power distribution system which comprises an earthed metal envelope system with a dielectric gas, sealed therein at least one high voltage conductor housed within said envelope system and protected, in use, from high voltage arcing to said envelope system by the dielectric gas, and a voltage measuring transformer also housed within said system and normally connected with said conductor to measure the voltage impressed thereon, the improvement wherein said conductor is provided with a fixed contact and said transformer is provided with a contact normally engaging said fixed contact whereby to allow the aforesaid voltage measurement, mounting means mounting said transformer for movement within said envelope system to engage and disengage said contact of the transformer with said fixed contact, and means disposed exteriorly of said envelope system for moving said transformer within the envelope system while maintaining the gas sealed therein, whereby to allow dielectric testing of the distribution system without imposing test voltage on the transformer.

2. In a high voltage distribution system as defined in claim 1 including a second fixed contact disposed within said envelope system and spaced from the first mentioned fixed contact but in the path of movement of the transformer contact whereby movement of the transformer may engage the transformer contact with the second mentioned fixed contact.

3. In a high voltage distribution system as defined in claim 2 wherein said transformer is movable between three positions, the first in which the transformer contact is engaged with said first fixed contact to allow the transformer to measure in use voltage, a second position in which said transformer contact is engaged with said second fixed contact to allow for said dielectric testing, and a third position in which said transformer contact is positioned in spaced relation to both of said fixed contacts whereby test voltage may be applied to said transformer without imposing such test voltage on the conductor.

4. In a high voltage distribution system as defined in any one of claims 1, 2 or 3 wherein said mounting means mounts said transformer for rectilinear movement of said transformer contact.

5. In a high voltage distribution system as defined in anyone of claims 1, 2 or 3 wherein said mounting means mounts said transformer for arcuate movement of said transformer contact.

6. In a high voltage distribution system as defined in claim 5 wherein there are three conductors housed within said envelope system, each having a first fixed contact in which such contacts are disposed in spaced relation within a circular path, there being three transformers disposed within said envelope system commonly supported by said mounting means and each having a transformer contact in which such transformer contacts are disposed in spaced relation within a circular path simultaneously to engage the respective first fixed contacts.

* * * * *